United States Patent
Vajravel et al.

(10) Patent No.: US 10,742,776 B1
(45) Date of Patent: Aug. 11, 2020

(54) ACCELERATING ISOCHRONOUS ENDPOINTS OF REDIRECTED USB DEVICES

(71) Applicant: Dell Products L.P., Round Rock, TX (US)

(72) Inventors: Gokul Thiruchengode Vajravel, Bengaluru (IN); Ankit Kumar, Deoghar (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/267,174

(22) Filed: Feb. 4, 2019

(51) Int. Cl.
- *H04L 29/06* (2006.01)
- *H04L 29/08* (2006.01)
- *H04L 12/741* (2013.01)
- *G06F 13/38* (2006.01)
- *G06F 9/455* (2018.01)

(52) U.S. Cl.
CPC ........ *H04L 69/162* (2013.01); *G06F 9/45558* (2013.01); *G06F 13/382* (2013.01); *H04L 45/54* (2013.01); *H04L 67/2842* (2013.01); *G06F 9/45545* (2013.01); *G06F 2009/45595* (2013.01); *G06F 2213/0042* (2013.01)

(58) Field of Classification Search
CPC .............. H04L 69/162; H04L 67/2842; G06F 9/45558; G06F 9/45545; G06F 13/382; G06F 2009/45595; G06F 2213/0042
See application file for complete search history.

(56) References Cited

U.S. PATENT DOCUMENTS

| | | | | |
|---|---|---|---|---|
| 7,478,180 B1 * | 1/2009 | Li | ............ | G06F 13/105 703/23 |
| 7,676,605 B1 * | 3/2010 | Citterelle | .............. | G06F 13/102 709/212 |
| 7,877,788 B1 * | 1/2011 | Topp | ...................... | G06F 21/85 713/189 |
| 8,171,483 B2 * | 5/2012 | Nord | ..................... | G06F 9/5077 717/120 |
| 8,224,885 B1 * | 7/2012 | Doucette | .............. | G06F 9/5044 709/201 |
| 8,667,574 B2 * | 3/2014 | Piazza | ................. | H04L 63/0209 726/11 |
| 9,397,944 B1 * | 7/2016 | Hobbs | .................... | H04L 47/00 |
| 9,430,424 B2 * | 8/2016 | Jin | .......................... | H04L 69/16 |
| 9,436,644 B1 * | 9/2016 | Haymond | .............. | G06F 13/10 |
| 2008/0071962 A1 * | 3/2008 | Yang | ..................... | H04L 41/046 710/313 |

(Continued)

*Primary Examiner* — Blake J Rubin
(74) *Attorney, Agent, or Firm* — Kirton McConkie; Brian Tucker

(57) ABSTRACT

Isochronous endpoints of a redirected USB device can be accelerated. When a USB device is redirected, each of the device's endpoints can be identified. A UDP socket can then be created between the client-side proxy and the server-side agent for each isochronous endpoint, while a TCP socket can be created for each other endpoint. A lookup table can also be created which maps pipe handles to socket IDs. The lookup table can be employed to route USB request blocks pertaining to a particular endpoint over the corresponding socket. In this way, USB request blocks pertaining to an isochronous endpoint will be transferred over the network using UDP while USB request blocks pertaining to non-isochronous endpoints will be transferred using TCP.

19 Claims, 13 Drawing Sheets

(56) References Cited

U.S. PATENT DOCUMENTS

| | | | |
|---|---|---|---|
| 2008/0140811 A1* | 6/2008 | Welch | H04L 12/4625 709/219 |
| 2009/0094387 A1* | 4/2009 | Bunger | G06F 21/606 710/11 |
| 2010/0161863 A1* | 6/2010 | Cota-Robles | G06F 11/0745 710/220 |
| 2010/0169071 A1* | 7/2010 | Oltuszyk | H04L 69/32 703/24 |
| 2011/0173351 A1* | 7/2011 | Aull | G06F 13/4282 710/8 |
| 2012/0066361 A1* | 3/2012 | Kim | H04L 61/106 709/223 |
| 2012/0158822 A1* | 6/2012 | Dai | G06F 9/4413 709/203 |
| 2012/0246359 A1* | 9/2012 | Scragg, Jr. | G06F 13/10 710/63 |
| 2013/0254263 A1* | 9/2013 | Kwon | H04L 69/168 709/203 |
| 2013/0262708 A1* | 10/2013 | McLeod | G06F 13/4252 710/2 |
| 2013/0297718 A1* | 11/2013 | Singh | G06F 3/0673 709/213 |
| 2014/0082235 A1* | 3/2014 | Kaushik | G06F 13/102 710/62 |
| 2014/0341110 A1* | 11/2014 | Sadeghi | G06F 13/385 370/328 |
| 2016/0179565 A1* | 6/2016 | Chen | H04L 67/08 710/313 |

* cited by examiner

*600*

601

In Conjunction With Redirecting A USB Device That Is Connected To A Client Terminal So That The USB Device Is Accessible Within A Remote Session On A Server, Obtain, For Each Of One Or More Endpoints Of The USB Device, A Pipe Handle Of The Endpoint

602

For Each Of The One Or More Endpoints, Determine A Pipe Type Of The Endpoint And, When The Pipe Type Is Isochronous, Create A Socket That Does Not Provide A Guarantee Of Delivery, Whereas, When The Pipe Type Is Not Isochronous, Create A Socket That Provides A Guarantee Of Delivery

603

Create A Lookup Table That Maps, For Each Of The One Or More Endpoints, The Pipe Handle Of The Endpoint To A Socket ID Of The Socket That Was Created For The Endpoint

604

Employ The Lookup Table To Route USB Request Blocks (URBs) Pertaining To A Particular Endpoint Over The Socket That Was Created For The Particular Endpoint

*FIG. 6*

ACCELERATING ISOCHRONOUS ENDPOINTS OF REDIRECTED USB DEVICES

CROSS-REFERENCE TO RELATED APPLICATIONS

N/A

BACKGROUND

The present invention is generally directed to USB device redirection in a virtual desktop infrastructure (VDI) environment. USB device redirection generally refers to making a USB device that is connected to a client accessible within a virtual desktop as if the USB device had been physically connected to the virtual desktop. In other words, when USB device redirection is implemented, a user can connect a USB device to his or her client terminal and the USB device will function as if it had been connected to the server.

FIGS. 1 and 2 and the following description will provide a general overview of how USB device redirection can be implemented. In FIG. 1, a computing system 100 is depicted as including a number of client terminals 102a-102n (referenced generally herein as client(s) 102) in communication with a server 104 via a network 106. Server 104 can be configured to support a remote session (e.g., a remote desktop session) wherein a user at a client 102 can remotely access applications and data at the server 104 from the client 102. Such a connection may be established using any of several well-known techniques such as the Remote Desktop Protocol (RDP) and the Citrix® Independent Computing Architecture (ICA).

Client terminal 102 may represent a computer, a mobile phone (e.g., smart phone), a laptop computer, a thin client terminal, a personal digital assistant (PDA), a portable computing terminal, or a suitable terminal or device with a processor. Server 104 may represent a computer, a laptop computer, a computing terminal, a virtual machine (e.g., VMwareg Virtual Machine), a desktop session (e.g., Microsoft Terminal Server), a published application (e.g., Microsoft Terminal Server) or a suitable terminal with a processor.

Client 102 may initiate a remote session with server 104 by sending a request for remote access and credentials (e.g., login name and password) to server 104. If server 104 accepts the credentials from client 102, then server 104 may establish a remote session, which allows a user at client 102 to access applications and data at server 104. During the remote session, server 104 sends display data to client 102 over network 106, which may include display data of a desktop and/or one or more applications running on server 104. The desktop may include, for example, icons corresponding to different applications that can be launched on server 104. The display data allows client 102 to locally display the desktop and/or applications running on server 104.

During the remote session, client 102 may send user commands (e.g., inputted via a mouse or keyboard at client 102) to server 104 over network 106. Server 104 may process the user commands from client 102 similar to user commands received from an input device that is local to server 104. For example, if the user commands include mouse movements, then server 104 may move a pointer on the desktop running on server 104 accordingly. When the display data of the desktop and/or application changes in response to the user commands, server 104 sends the updated display data to client 102. Client 102 locally displays the updated display data so that the user at client 102 can view changes at server 104 in response to the user commands. Together, these aspects allow the user at client 102 to locally view and input commands to the desktop and/or application that is running remotely on server 104. From the perspective of the client, the desktop running on server 104 may represent a virtual desktop environment.

FIG. 2 is a block diagram of a local device virtualization system 200. System 200 may include client 102 in communication with server 104 over network 106 as illustrated in FIG. 1. Client 102 may include a proxy 210, a stub driver 220, and a bus driver 230. Client 102 can be connected to a device 240, as shown in FIG. 2. Server 104 may include an agent 250 and a virtual bus driver 260. In accordance with USB device redirection techniques, while device 240 is not locally or physically connected to server 104 and is remote to server 104, device 240 appears to server 104 as if it is locally connected to server 104, as discussed further below. Thus, device 240 appears to server 104 as a virtual device 290.

By way of illustration and not limitation, device 240 may be any type of USB device including a machine-readable storage medium (e.g., flash storage device), a printer, a scanner, a camera, a facsimile machine, a phone, an audio device (e.g., a headset), a video device (e.g., a camera), a peripheral device, or other suitable device that can be connected to client 102. Device 240 may be an external device (i.e., external to client 102) or an internal device (i.e., internal to client 102). For purposes of this application, device 240 can represent an authentication device such as a smart card.

Bus driver 230 can be configured to allow the operating system and programs of client 102 to interact with device 240. In one aspect, when device 240 is connected to client 102 (e.g., plugged into a port of client 102), bus driver 230 may detect the presence of device 240 and read information regarding device 240 ("device information") from device 240. The device information may include features, characteristics and other information specific to device 240 such as a device descriptor (e.g., product ID, vendor ID and/or other information), a configuration descriptor, an interface descriptor, an endpoint descriptor and/or a string descriptor. Bus driver 230 may communicate with device 240 through a computer bus or other wired or wireless communications interface.

In accordance with USB device redirection techniques, device 240 may be accessed from server 104 as if the device were connected locally to server 104. Device 240 may be accessed from server 104 when client 102 is connected to server 104 through a remote session running on server 104. For example, device 240 may be accessible from the desktop running on server 104 (i.e., virtual desktop environment). To enable this, bus driver 230 may be configured to load stub driver 220 as the default driver for device 240. Stub driver 220 may be configured to report the presence of device 240 to proxy 210 and to provide the device information (e.g., device descriptor) to proxy 210. Proxy 210 may be configured to report the presence of device 240, along with the device information, to agent 250 of server 104 over network 106 (e.g., via a TCP or UDP socket). Thus, stub driver 220 redirects device 240 to server 104 via proxy 210.

Agent 250 may be configured to receive the report from proxy 210 that device 240 is connected to client 102 and the device information. Agent 250 may further be configured to associate with the report from proxy 210 one or more identifiers for client 102 and/or for a remote session through which client 102 is connected to server 104, such as a session number or a session locally unique identifier (LUID). Agent 250 can provide notification of device 240, along with the device information, to virtual bus driver 260. Virtual bus driver 260 (which may be a Dell Wyse TCX USB bus driver, or any other bus driver) may be configured to create and store in memory a record corresponding to device 240. This record may include at least part of the device information and session identifiers received from agent 250. Virtual bus driver 260 may be configured to report to operating system 170 of server 104 that device 240 is connected and to provide the device information to the operating system. This allows the operating system of server 104 to recognize the presence of device 240 even though device 240 is connected to client 102.

The operating system of server 104 may use the device information to find and load one or more appropriate device drivers for device 240 at server 104. Each driver may have an associated device object (object(s) 281*a*, 281*b*, . . . , 281*n*, referred to generally as device object(s) 281), as illustratively shown in FIG. 2. A device object 281 is a software implementation of a real device 240 or a virtualized (or conceptual) device 290. Different device objects 281 layer over each other to provide the complete functionality. The different device objects 281 are associated with different device drivers (driver(s) 282*a*, 282*b*, . . . 282*n*, referred to generally as device driver(s) 282). In an example, a device 240 such as a USB flash drive may have associated device objects including objects corresponding to a USB driver, a storage driver, a volume manager driver, and a file system driver for the device. The device objects 281 corresponding to a same device 240 form a layered device stack 280 for device 240. For example, for a USB device, a USB bus driver will create a device object 281*a* stating that a new device has been plugged in. Next, a plug-and-play (PNP) component of the operating system will search for and load the best driver for device 240, which will create another device object 281*b* that is layered over the previous device object 281*a*. The layering of device objects 281 will create device stack 280.

Device objects 281 may be stored in a memory of the server 104 associated with virtual bus driver 260. In particular, device objects 281 and resulting device stack 280 may be stored in random-access memory of server 104. Different devices 240/290 can have device stacks having different device objects and different numbers of device objects. The device stack may be ordered, such that lower level device objects (corresponding to lower level device drivers) have lower numbers than higher level device objects (corresponding to higher level device drivers). The device stack may be traversed downwards by traversing the stack from higher level objects to lower level objects. For example, in the case of an illustrative device stack 280 corresponding to a USB flash drive, the ordered device stack may be traversed downwards from a high-level file system driver device object, to a volume manager driver device object, to a storage driver device object, to a USB driver device object, and finally to a low-level virtual bus driver device object. Different device stacks 280 can be layered over each other to provide the functionality of the devices 240/290 inside devices, like USB Headsets, or USB pen drives. A USB pen drive, for example, can create a USB device stack first, over which it can create a storage device stack, where each of the device stacks have two or more device objects.

Once one or more device object(s) 281 are loaded by operating system 170 of server 104, each device object 281 can create a symbolic link (also referred to as a "device interface") to device object 281 and associated device driver 282. The symbolic link is used by applications running on server 104 to access device object 281 and device 240/290. The symbolic link can be created by a call to a function such as IoCreateSymbolicLink( ) including such arguments as a name for the symbolic link, and a name of device object 281 or associated device 240. In one example, for example, a symbolic link to a USB flash drive device 240 is created by a call from a device object 281 for device 240 to the function IoCreateSymbolicLink( ) including arguments "\\GLOBAL??\C:" (i.e., the name for the symbolic link) and "\Device\HarddiskVolume1" (i.e., a name of the device object).

The creation of a symbolic link results in an entry being created in an object manager namespace (OMN) of operating system 170. The OMN stores information on symbolic links created for and used by operating system 170, including symbolic links for devices 240, virtualized devices 290, and applications 270 running on server 104.

As a result of the symbolic link creation process, a symbolic link to device 240 is enumerated in the OMN of server 104. Once the presence of device 240 is reported to operating system 170 of server 104, device 240 may be accessible from a remote session (and associated desktop) running on server 104 (i.e., virtual desktop environment). For example, device 240 may appear as an icon on the virtual desktop environment and/or may be accessed by applications running on server 104.

An application 270 running on server 104 may access device 240 by sending a transaction request including the symbolic link for device 240 to operating system 170. Operating system 170 may consult the Object Manager Namespace to retrieve an address or other identifier for the device itself 240 or for a device object 281 associated with device 240. Using the retrieved address or identifier, operating system 170 forwards the transaction request for device 240 either directly, through a device object 281 of device stack 280, and/or through virtual bus driver 260. Virtual bus driver 260 may direct the transaction request to agent 250, which sends the transaction request to proxy 210 over network 106. Proxy 210 receives the transaction request from agent 250, and directs the received transaction request to stub driver 220. Stub driver 220 then directs the transaction request to device 240 through bus driver 230.

Bus driver 230 receives the result of the transaction request from device 240 and sends the result of the transaction request to stub driver 220. Stub driver 220 directs the result of the transaction request to proxy 210, which sends the result of the transaction request to agent 250 over network 106. Agent 250 directs the result of the transaction request to virtual bus driver 260. Virtual bus driver 260 then directs the result of the transaction request to application 270 either directly or through a device object 281 of device stack 280.

Thus, virtual bus driver 260 may receive transaction requests for device 240 from application 270 and send results of the transaction requests back to application 270 (either directly or through a device object 281 of device stack 280). As such, application 270 may interact with virtual bus driver 260 in the same way as with a bus driver for a device that is connected locally to server 104. Virtual bus driver 260 may hide the fact that it sends transaction requests to agent 250 and receives the results of the transaction requests from agent 250 instead of a device that is connected locally to server 104. As a result, device 240 connected to client 102 may appear to application 270 as if the physical device 240 is connected locally to server 104.

In this architecture, proxy 210 and agent 250 communicate USB data over a network via a socket. It is common to use TCP sockets since TCP provides reliable in-order packet delivery (i.e., TCP favors reliability over timeliness). However, the use of TCP sockets can degrade performance in certain circumstances such as when proxy 210 and agent 250 are connected via a lossy and/or high latency network.

More particularly, some USB devices, such as streaming devices, use isochronous transfers to continuously and periodically send time sensitive data. These devices include web cameras, microphones, VoIP headsets, speakers, image scanners, etc. Isochronous transfers are suitable for such devices since they provide guaranteed access to USB bandwidth, bounded latency, a unidirectional stream pipe, error detection via CRC with no retry or guarantee of delivery, only full and high speed modes and no data toggling. Yet, in a lossy network, the reliability mechanisms of TCP oftentimes oppose these characteristics of isochronous transfers. For example, in a redirection scenario, the isochronous data will be encapsulated in network packets and sent over the network using TCP. If a packet is lost, TCP will resend the lost packet and any subsequent packets will be held until the lost packet is received. TCP's reliable in-order delivery can therefore stall an isochronous transfer, and in some cases, the stall is significant enough to crash server 104.

Such issues with isochronous transfers could be reduced by employing UDP rather than TCP to transfer network packets between proxy 210 and agent 250. UDP does not provide guaranteed delivery. Therefore, if a packet is lost, UDP will not stall an isochronous transfer to wait until the lost packet is received as would be the case with TCP. Even though UDP may be a more suitable protocol for isochronous transfers, it is an unsuitable protocol for other types of USB transfers. For example, USB printers typically use bulk transfers which provide guaranteed delivery. If UDP were used to send network packets containing bulk data, any network packet that is lost would not be resent. This would result in the USB bulk transfer mechanism requesting the lost bulk data. Therefore, if redirection is implemented over a lossy network using UDP, a bulk transfer may never complete. In short, neither TCP nor UDP is an ideal protocol for redirecting all USB transfer types.

BRIEF SUMMARY

The present invention extends to methods, systems, and computer program products for accelerating isochronous endpoints of redirected USB devices. When a USB device is redirected, each of the device's endpoints can be identified. A UDP socket can then be created between the client-side proxy and the server-side agent for each isochronous endpoint, while a TCP socket can be created for each other endpoint. A lookup table can also be created which maps each endpoint to its corresponding socket. The lookup table can be employed to route USB request blocks pertaining to a particular endpoint over the corresponding socket. In this way, USB request blocks pertaining to an isochronous endpoint will be transferred over the network using UDP while USB request blocks pertaining to non-isochronous endpoints will be transferred using TCP.

In some embodiments, the present invention is implemented as a method for accelerating isochronous endpoints of redirected USB devices. In conjunction with redirecting a USB device that is connected to a client terminal so that the USB device is accessible within a remote session on a server, a pipe handle for each of one or more endpoints of the USB device can be obtained. For each of the one or more endpoints, a pipe type of the endpoint can also be determined. When the pipe type is isochronous, a socket that does not provide a guarantee of delivery can be created, whereas, when the pipe type is not isochronous, a socket that provides a guarantee of delivery can be created. A lookup table can also be crated which maps, for each of the one or more endpoints, the pipe handle of the endpoint to a socket ID of the socket that was created for the endpoint. The lookup table can then be employed to route URBs pertaining to a particular endpoint over the socket that was created for the particular endpoint.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIG. 6 provides a flowchart of an example method for accelerating an isochronous endpoint of a redirected USB device.

DETAILED DESCRIPTION

The present invention is directed to techniques for accelerating an isochronous endpoint of a redirected USB device. In this context, "accelerating" refers to enhancing the efficiency of transferring data to or from the isochronous endpoint when the transfer occurs over a network due to the redirection of the USB device. To accomplish this, and in comparison to the prior art redirection techniques described in the background, the proxy and agent can be configured to perform new and unique functionality such that the acceleration of an isochronous endpoint occurs in a manner that is transparent to the other components (e.g., device stack 280) and agnostic to the remoting protocol (i.e., the acceleration can be accomplished when the remoting protocol is RDP, PCoIP, ICA or any other protocol).

Figure 1:
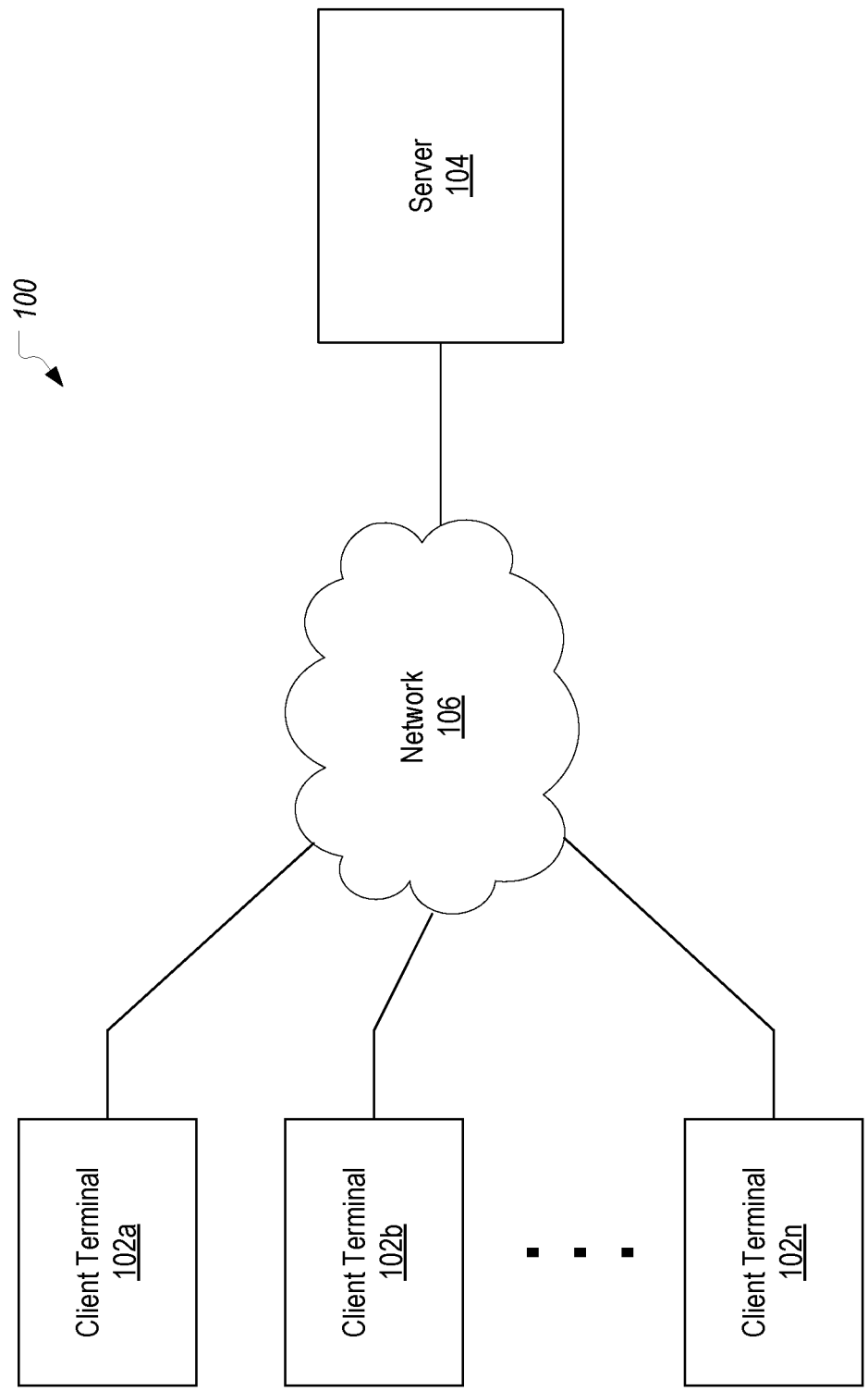
FIG. 1 illustrates an example computing environment in which the present invention can be implemented.
Figure 2:
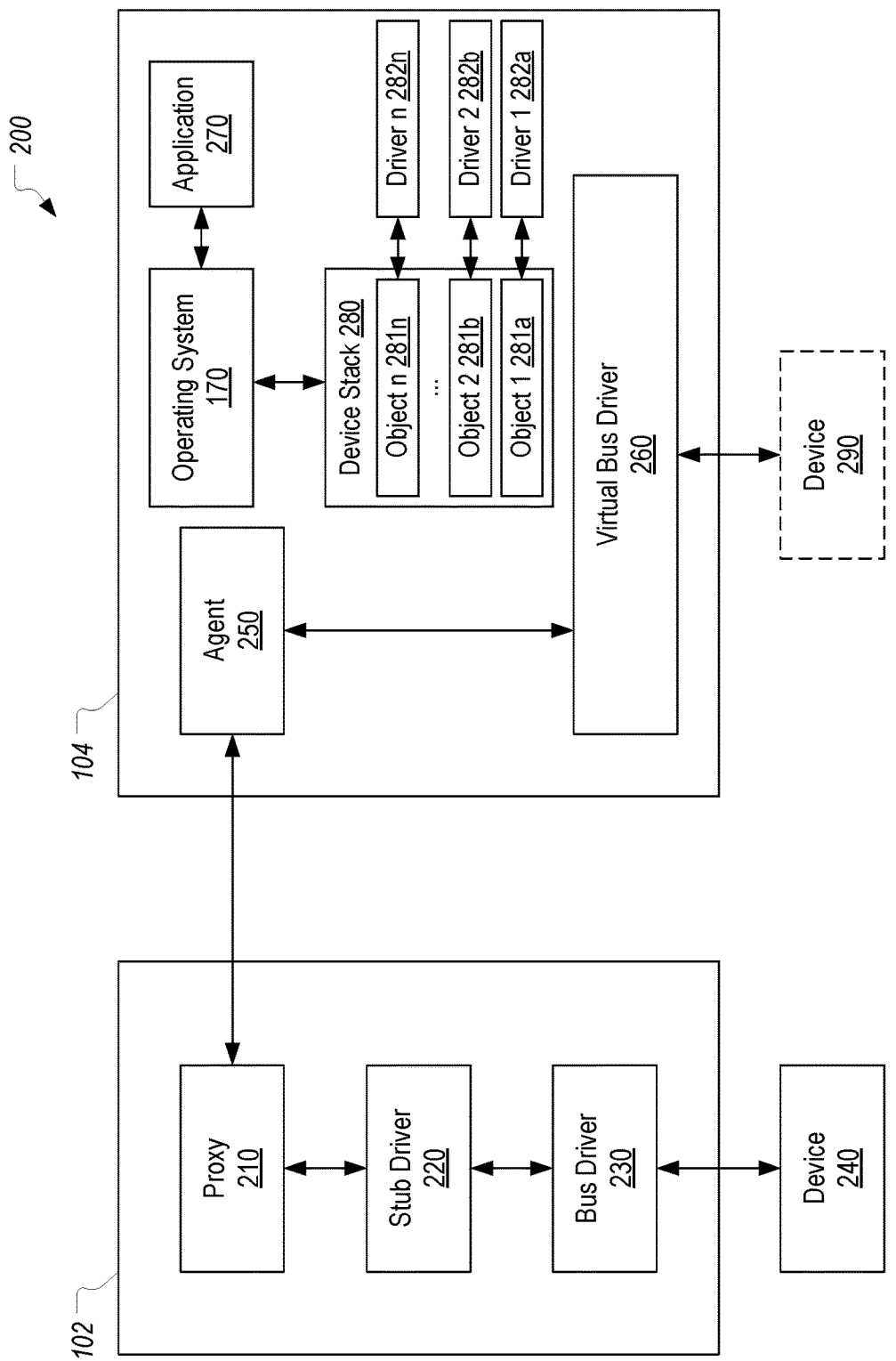
FIG. 2 illustrates how a USB device can be redirected from a client terminal to a server.
Figure 3:
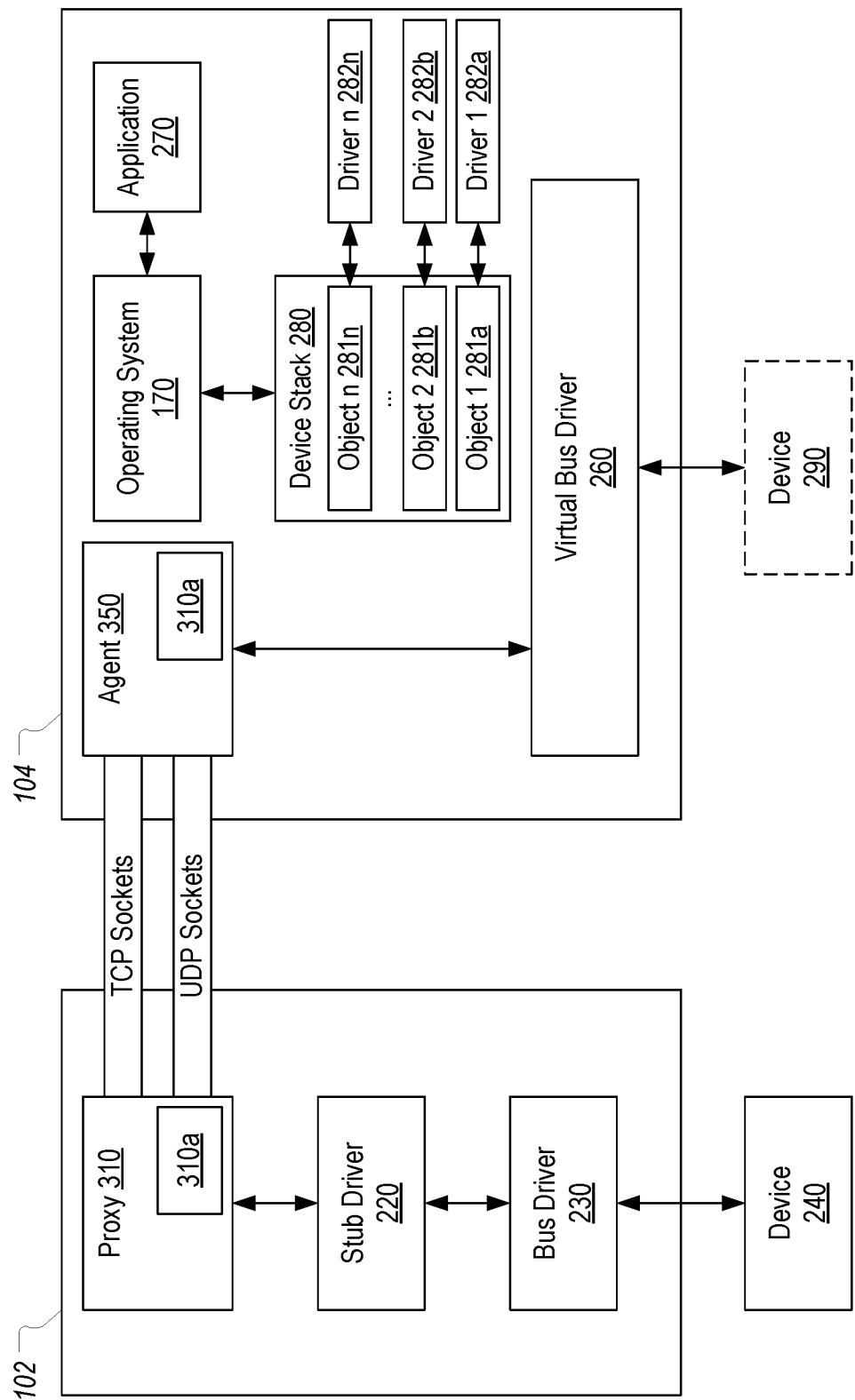
FIG. 3 illustrates an example architecture that can be employed to accelerate an isochronous endpoint of a redirected USB device in accordance with embodiments of the present invention.
Figure 3A:
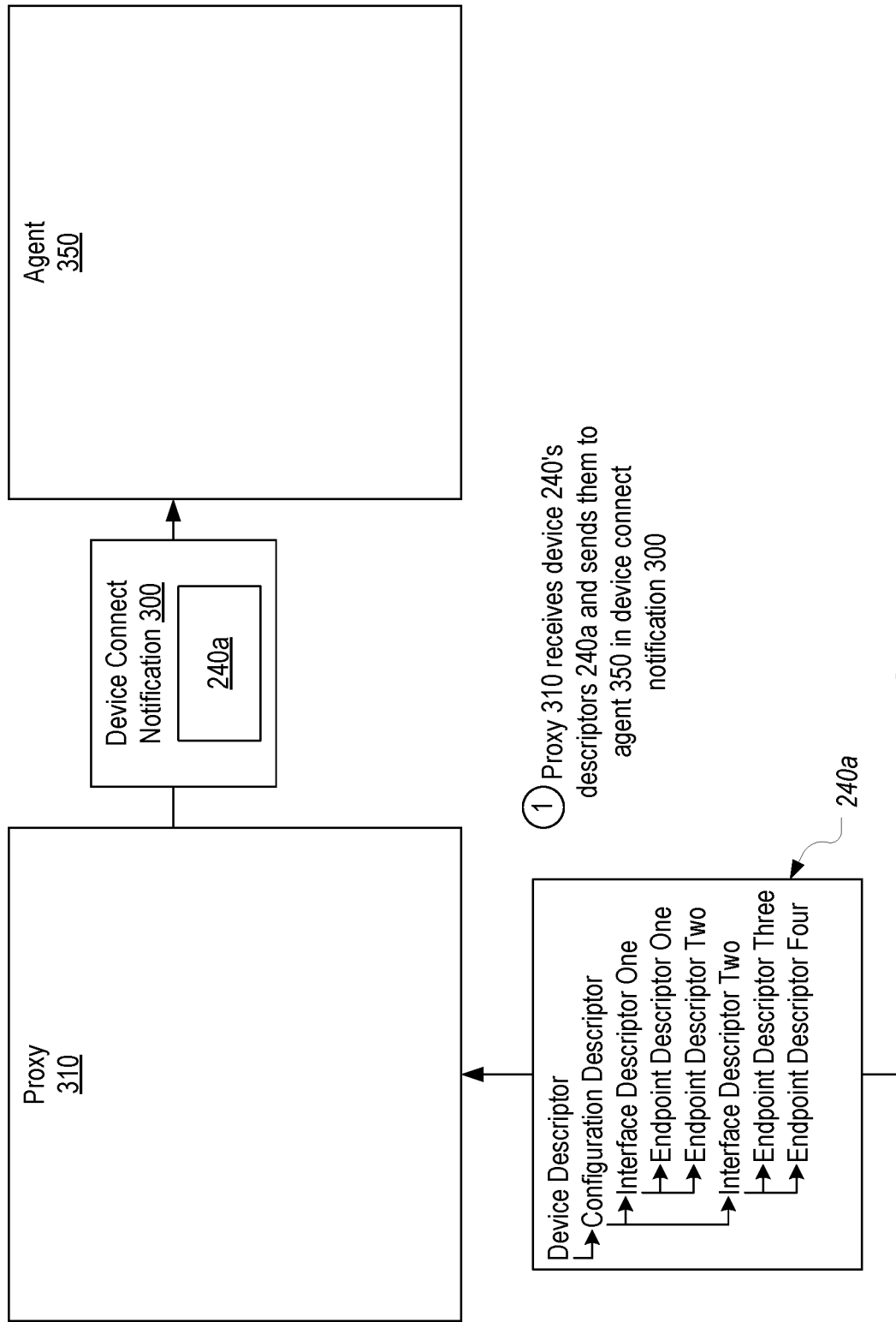
FIGS. 3A-3E illustrate an example of how the architecture of FIG. 3 can be configured.

FIG. 3 illustrates an example architecture that proxy 310 and agent 350 can create to enable isochronous endpoints to be accelerated. As shown, the components other than proxy 310 and agent 350 can be the same as in local device virtualization system 200. In contrast, proxy 310 and agent 350 are configured to employ TCP sockets to communicate USB request blocks (URBs) pertaining to non-isochronous endpoints and UDP sockets to communicate URBs pertaining to isochronous endpoints. To enable this, proxy 310 can create a lookup table 310a and share it with agent 350. Proxy 310 and agent 350 can then employ lookup table 310a to determine how to route a particular URB.

FIGS. 3A-3E provide an example of how proxy 310 and agent 350 can create the architecture shown in FIG. 3. In step 1 shown in FIG. 3A, proxy 310 is shown as receiving device 240's descriptor 240a. As is generally described in the background, proxy 310 can receive descriptor 240a from stub driver 220 in response to device 240 being connected to client terminal 102 while a remote session is established on server 104, in response to the establishment of the remote session, in response to user input, etc.

In this example, it will be assumed that device 240 includes a single configuration (as defined by its configuration descriptor) and that this configuration includes two interfaces (as defined by interface descriptor one and interface descriptor two) each of which includes two endpoints (as defined by endpoint descriptors one through four). It will also be assumed that both interfaces should be redirected to server 104 (e.g., based on a policy that defines the types of interfaces that should be redirected as opposed to being kept local). Accordingly, proxy 310 can respond to the receipt of descriptors 240a by sending a device connect notification 300 that includes descriptors 240a to agent 350. Although not shown, agent 350 would route device connect notification 300 to virtual bus driver 260 which in turn would initiate the enumeration process to cause device stack 280 to be loaded on server 104.

Figure 3B:
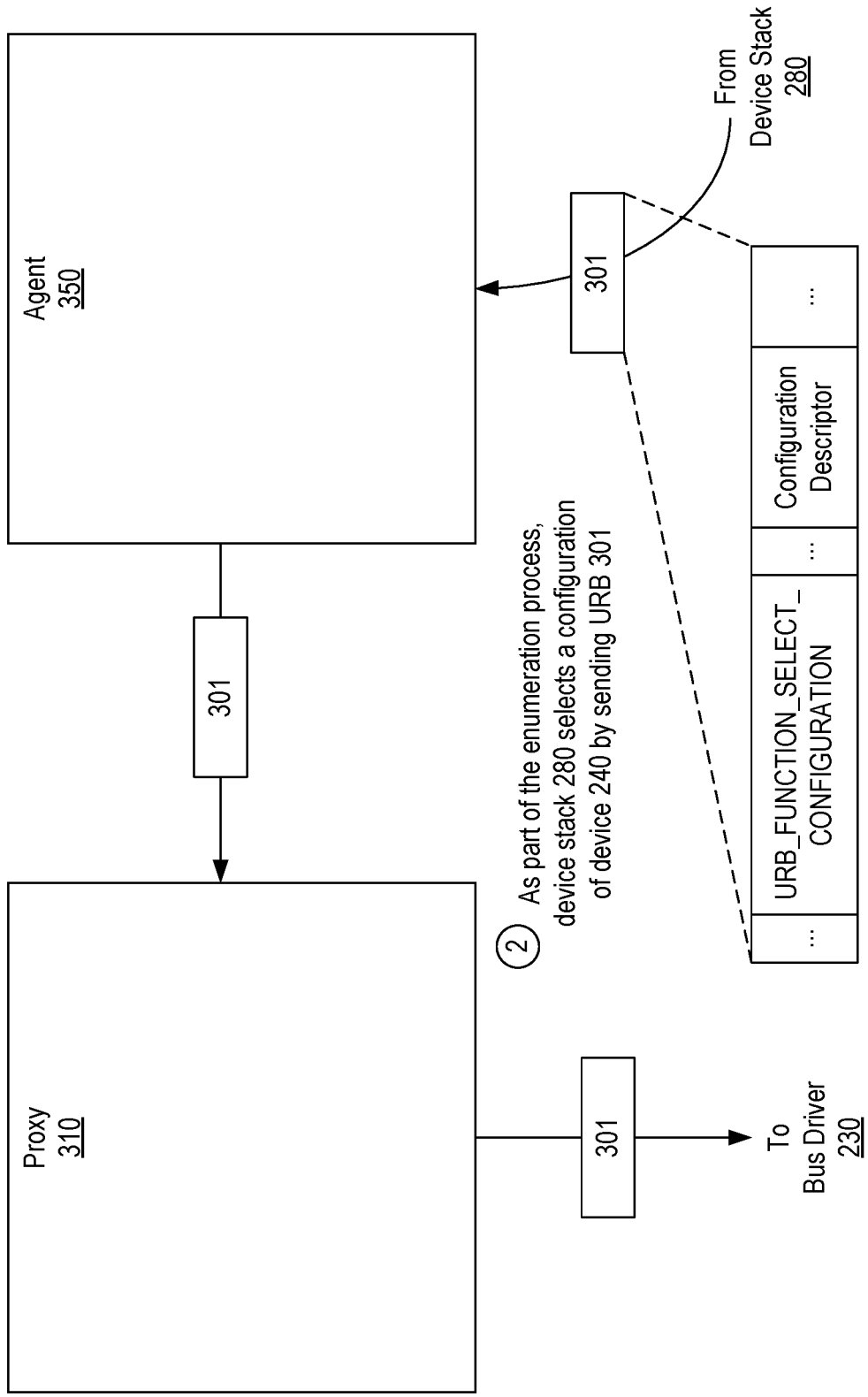
Figure 3C:
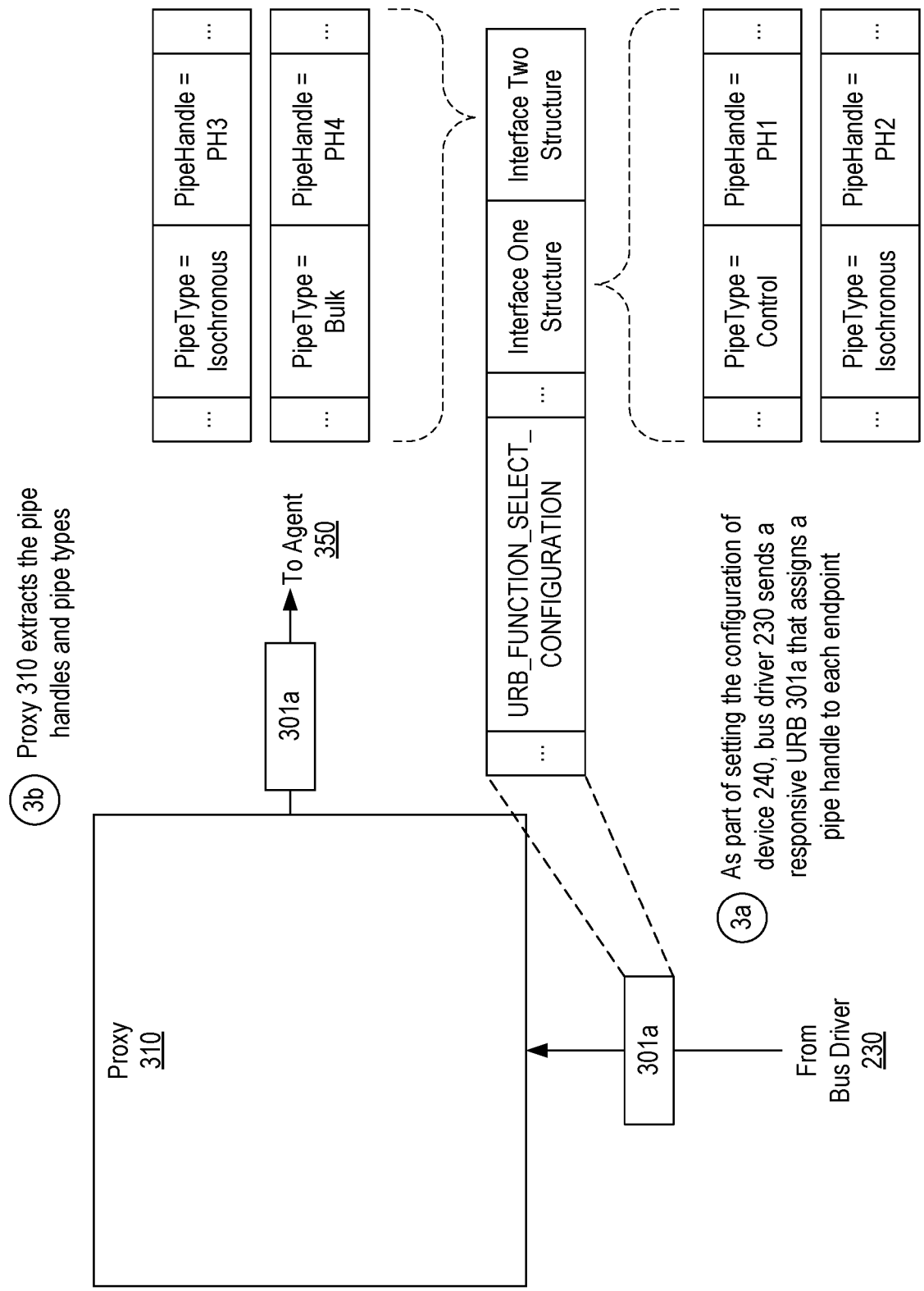

Turning to FIG. 3B, as part of the enumeration process, device stack 280 may send an URB 301 specifying the URB_FUNCTION_SELECT_CONFIGURATION function in step 2. As is known, this type of URB can be used to select the configuration of the USB device. Agent 350 will route URB 301 to proxy 310 which in turn will send URB 301 to bus driver 230. As shown in FIG. 3C as step 3a, and as part of selecting the configuration, bus driver 230 will respond with URB 301a which generally matches URB 301 but will include a populated USBD_INTERFACE_INFORMATION structure for each interface of the selected configuration. Since the selected configuration of device 240 includes two interfaces, URB 301a will include two such structures which are represented as Interface One Structure and Interface Two Structure. Each USBD_INTERFACE_INFORMATION structure identifies a USBD_PIPE_INFORMATION structure for each of the endpoints of the corresponding interface. Therefore, in this example, URB 301a will identify four USBD_PIPE_INFORMATION structures two for Interface One and two for Interface two.

Each USBD_PIPE_INFORMATION structure will define a "PipeType" and a "PipeHandle" for the corresponding endpoint. The value for PipeType will be based on the transfer type that the endpoint supports and is derived from the bmAttributes field of the endpoint descriptor. For purposes of this example, it will be assumed that Endpoint Descriptor One defines a control transfer type, Endpoint Descriptor Two defines an isochronous transfer type, Endpoint Descriptor Three defines an isochronous transfer type and Endpoint Descriptor Four defines a Bulk transfer type. In other words, Interface One provides a control endpoint and an isochronous endpoint while Interface Two provides an isochronous endpoint and a bulk endpoint.

The value for PipeHandle is assigned by bus driver 230 and functions as a unique value that the client drivers can employ to subsequently send URBs to a particular endpoint.

In this example, it will be assumed that the PipeHandles of PH1 and PH2 have been assigned to the control and isochronous endpoints respectively of Interface One and that the PipeHandles of PH3 and PH4 have been assigned to the isochronous and bulk endpoints respectively of Interface Two. As represented in step 3b, proxy 310 can process URB 301a to extract the PipeHandle and PipeType for each endpoint. Proxy 310 can also forward URB 301a on to agent 350 so that it can be routed back to device stack 280.

Figure 3D:
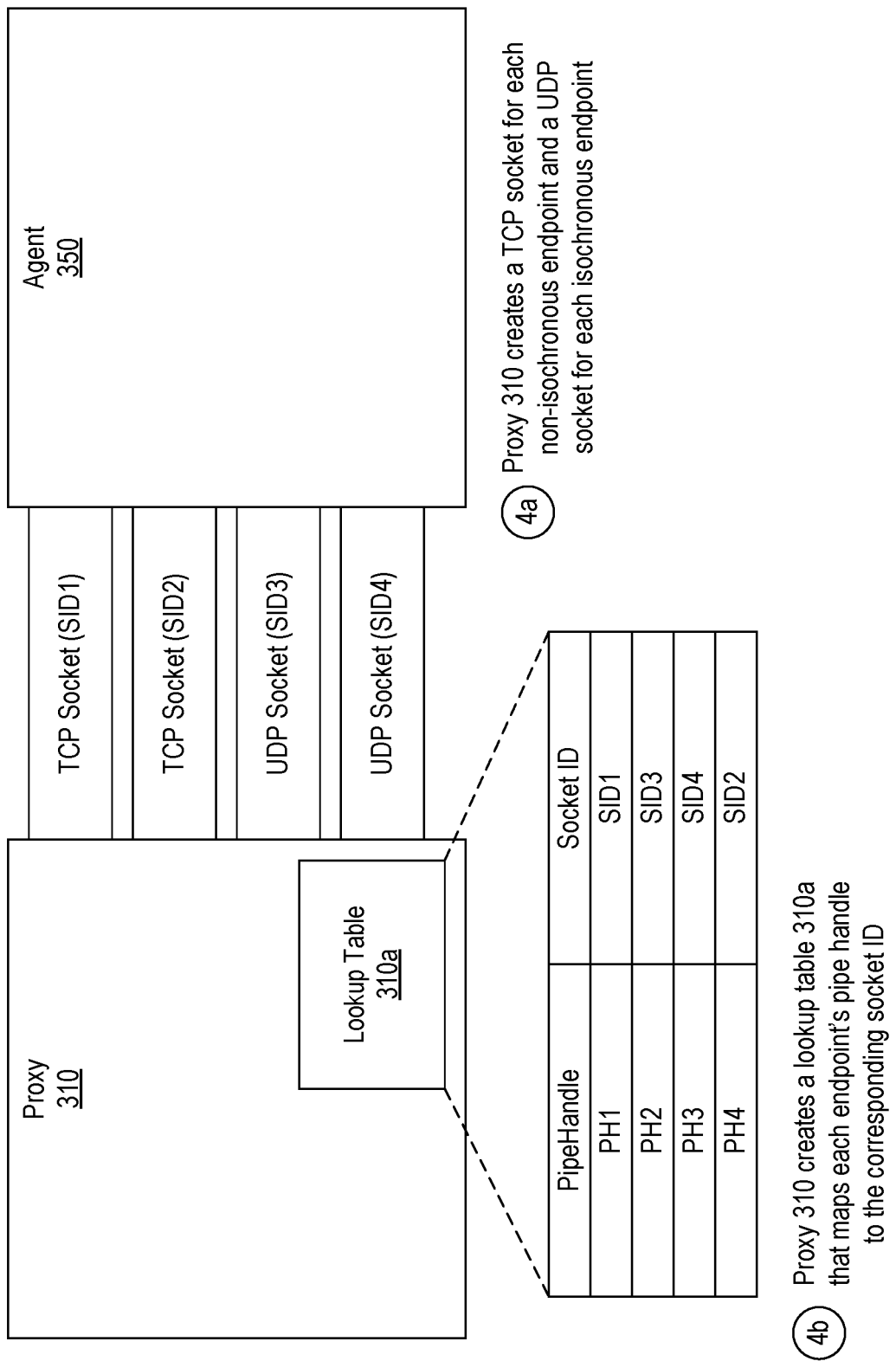

Next, in step 4a which is shown in FIG. 3D, proxy 310 can create either a TCP socket or a UDP socket for each endpoint defined in URB 301a. Importantly, for any isochronous endpoint (i.e., for any endpoint having a PipeType of isochronous), proxy 310 can establish, with agent 350, a UDP socket that provides ordered delivery of packets but that does not provide guaranteed delivery of packets. In contrast, for any control, bulk or interrupt endpoint (i.e., for any endpoint having a PipeType of control, bulk or interrupt), proxy 310 can establish, with agent 350, a TCP socket (or at least a reliable UDP socket that provides ordered and guaranteed delivery of packets).

Accordingly, in this example, proxy 310 will create four sockets: two TCP (or reliable UDP) sockets, one for each of the control and bulk endpoints; and two UDP sockets, one for each of the two isochronous endpoints. It will be assumed that the TCP socket created for the control endpoint has a socket ID of SID1, the TCP socket created for the bulk endpoint has a socket ID of SID2, the UDP socket created for the isochronous endpoint of Interface One has a socket ID of SID3 and the UDP socket created for the isochronous endpoint of Interface Two has a socket ID of SID4. For purposes of this description and the claims, a socket ID should be construed as any identifier or group of identifiers that uniquely identifies a particular network socket.

In step 4b, after having created a socket for each endpoint and obtaining a socket ID for each socket, proxy 310 can create lookup table 310a which maps the PipeHandle of each endpoint to the socket ID of the socket that proxy 310 created for that endpoint. Therefore, in this example and as shown in FIG. 3D, proxy 310 has mapped PH1 to SID1, PH2 to SID3, PH3 to SID4 and PH4 to SID2.

Figure 3E:
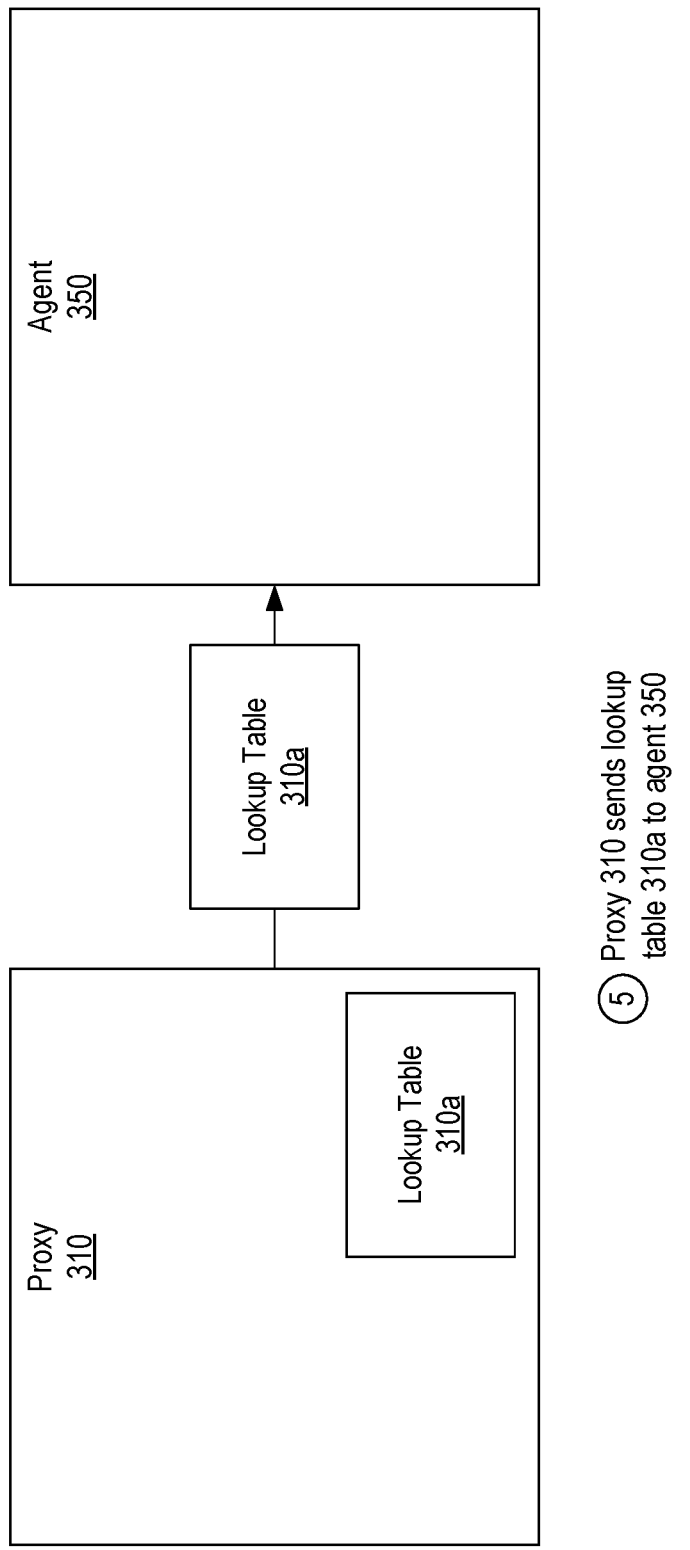

Finally, in step 5 shown in FIG. 3E, proxy 310 shares lookup table 310a with agent 350. In this way, both proxy 310 and agent 350 will be able to identify the particular socket that was created for each endpoint of device 240. In some embodiments, proxy 310 can share lookup table 310a with agent 350 in conjunction with sending URB 301a to agent 350. Although FIGS. 3A-3E illustrate that proxy 310 creates lookup table 310a and then shares it with agent 350, in other embodiments, agent 350 could create lookup table 310a and share it with proxy 310.

Figure 4A:
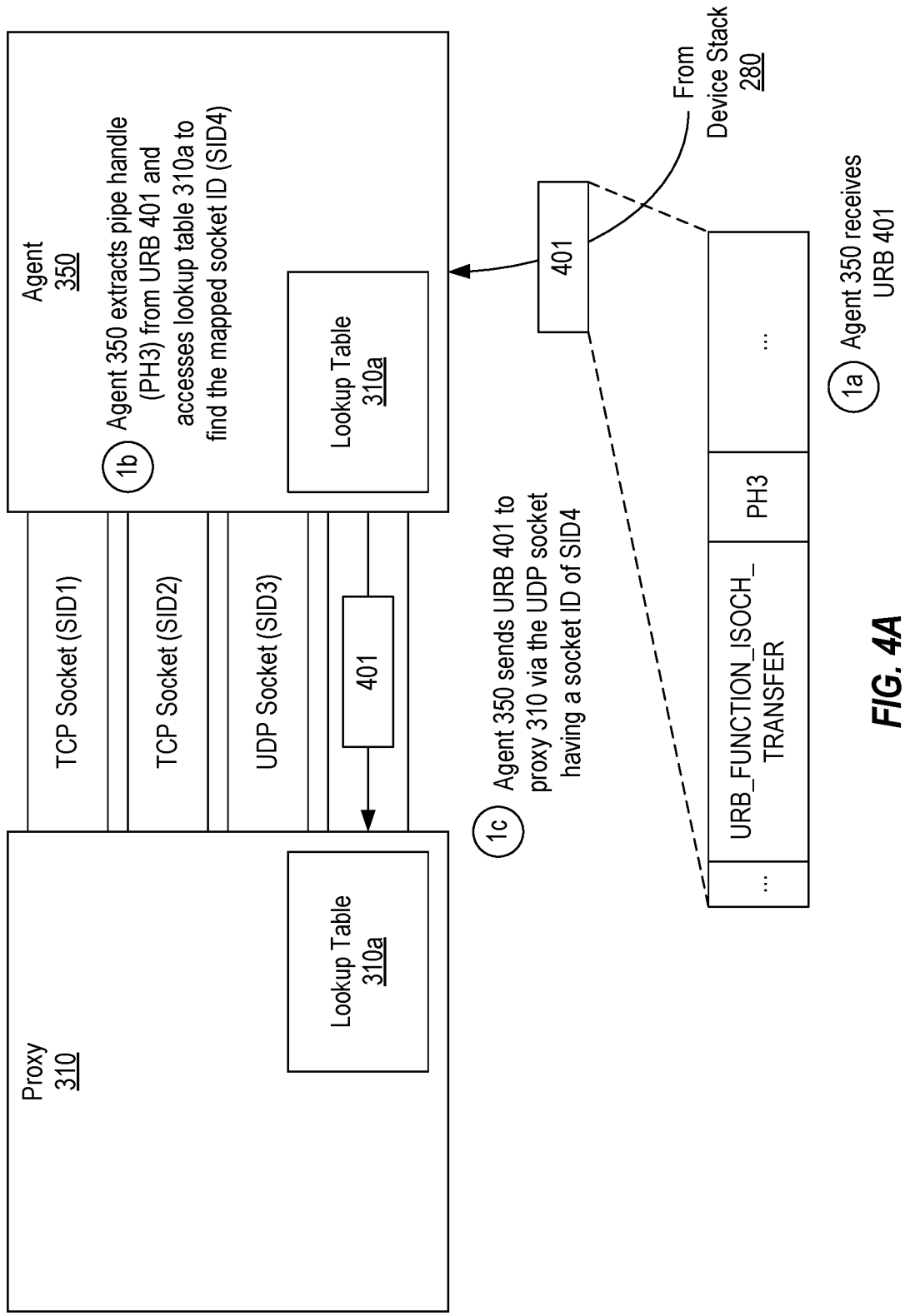
FIGS. 4A and 4B illustrate an example of how an URB targeting an isochronous endpoint can be processed in the architecture of FIG. 3.
Figure 4B:
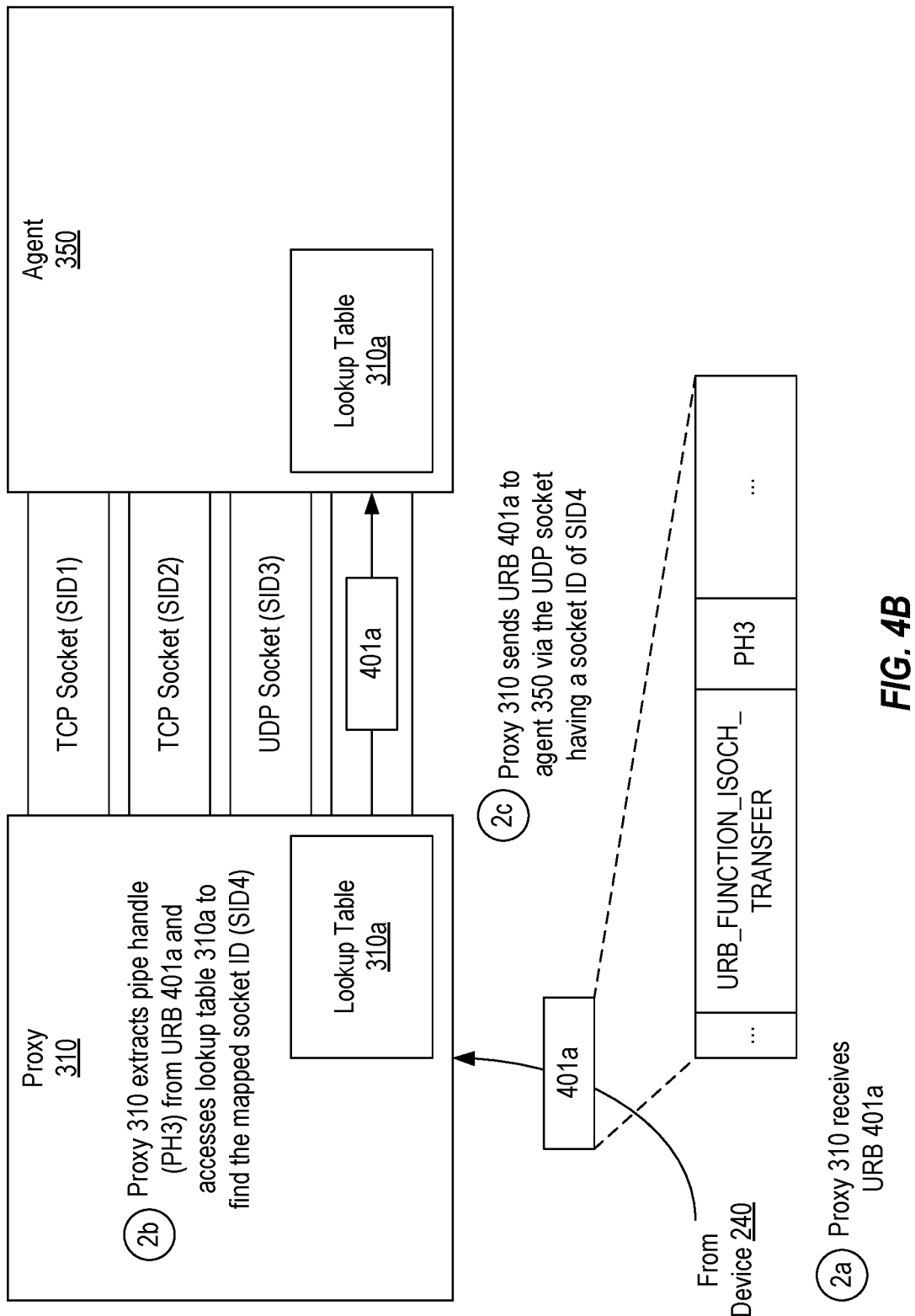

FIGS. 4A and 4B provide an example of how agent 350 and proxy 310 can route an URB that targets an isochronous endpoint of a redirected USB device. In step 1a shown in FIG. 4A, agent 350 is shown as receiving an URB 401 from device stack 280. In this example, it will be assumed that URB 401 constitutes a request to read data from the isochronous endpoint of Interface Two. Accordingly, URB 401 will define the URB_FUNCTION_ISOCH_TRANSFER function and will include a PipeHandle of PH3. It is noted that proxy 310 and agent 350 would handle a request to write data to the isochronous endpoint in the same manner.

In step 1b, agent 350 will extract the PipeHandle from URB 401 and use it to access lookup table 310a. As shown in FIG. 3D, lookup table 310a maps PH3 to SID4, and therefore, agent 350 will extract SID4 from lookup table 310a so that it can route URB 401 over the socket that was created for the isochronous endpoint of Interface Two. More specifically, in step 1c, agent 350 will employ SID4 to send packets containing URB 401 (or the contents of URB 401) over the UDP socket having a socket ID of SID4.

Although not shown, upon receiving URB 401, proxy 310 will send the URB to device 240 (via stub driver 220 and bus driver 230) to cause the requested data to be read. Then, as shown in FIG. 4B as step 2a, proxy 310 will receive a responsive URB 401a that includes the read data. URB 401a will also include a PipeHandle of PH3. In step 2b, proxy 310 extracts the PipeHandle PH3 from URB 401a and uses it to retrieve the mapped socket ID, SID4, from lookup table 310a. In step 2c, proxy 310 sends URB 401a (or the contents of URB 401a) over the UDP socket having a socket ID of SID4. Although not shown, agent 350 will receive URB 401a and route it back to device stack 280.

Figure 5A:
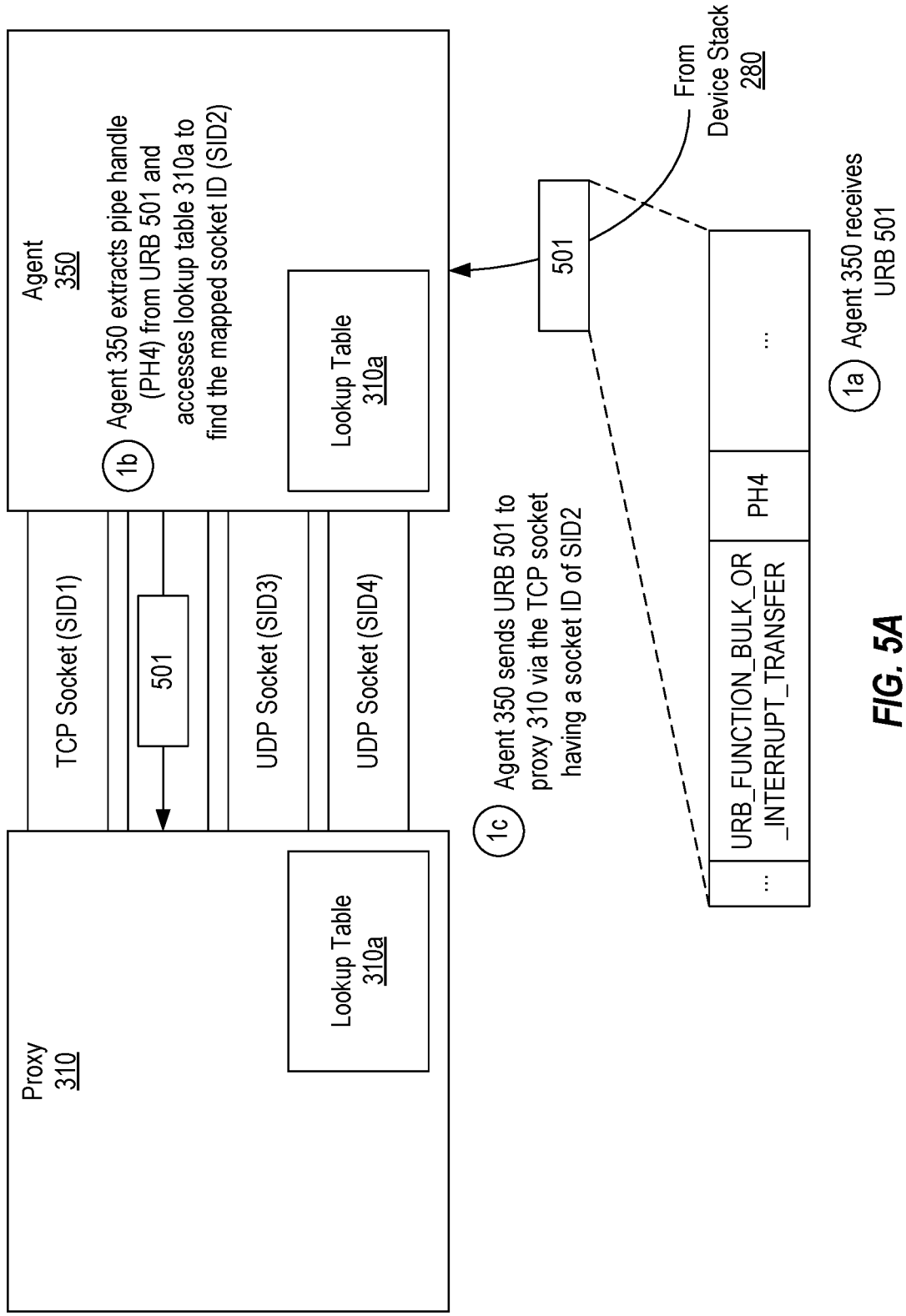
FIGS. 5A and 5B illustrate an example of how an URB targeting a non-isochronous endpoint can be processed in the architecture of FIG. 3.
Figure 5B:
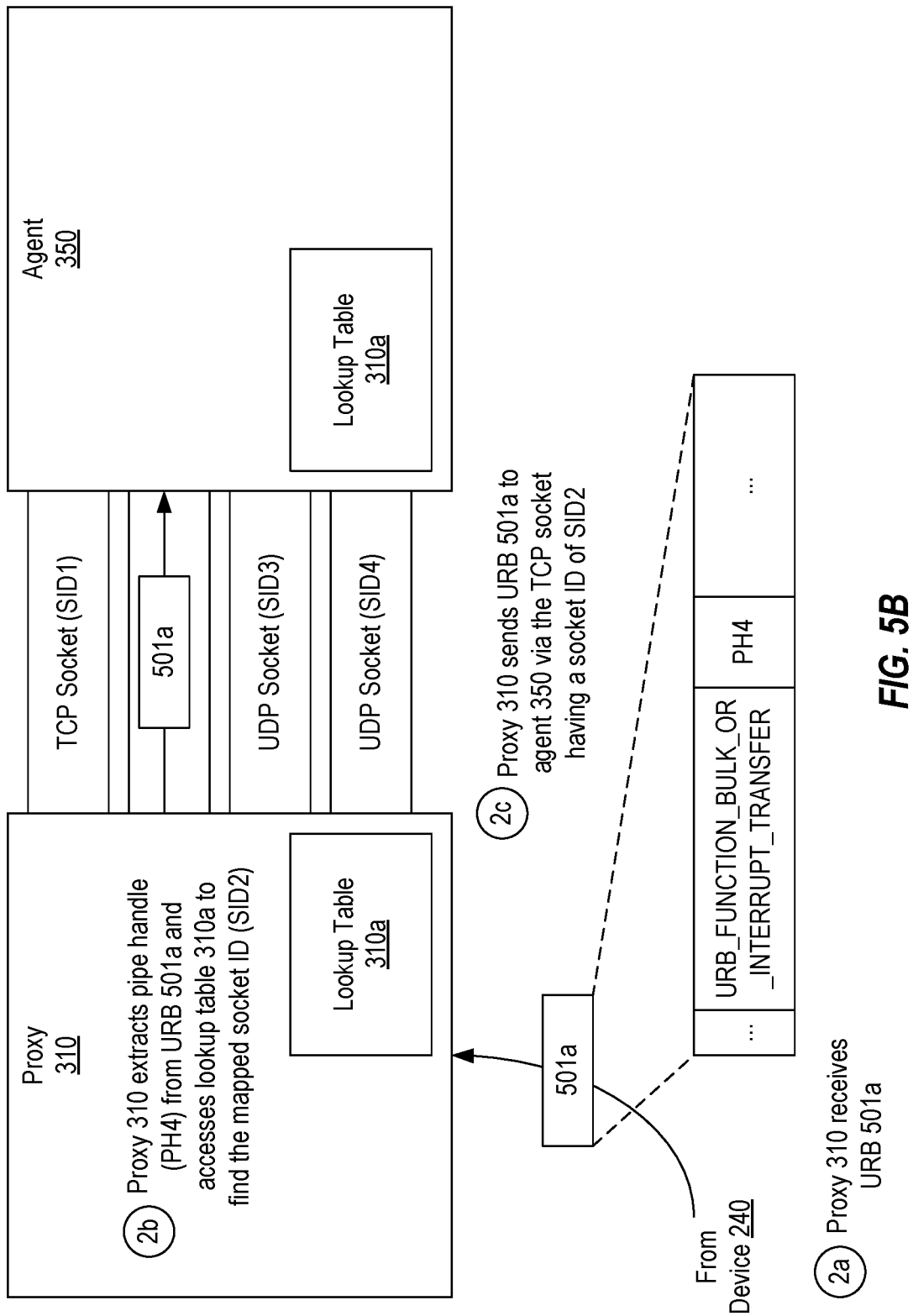

FIGS. 5A and 5B illustrate an example of how agent 350 and proxy 310 can route an URB that targets a non-isochronous endpoint of a redirected USB device. In step 1a shown in FIG. 5A, agent 350 is shown as receiving an URB 501 from device stack 280. In this example, it will be assumed that URB 501 constitutes a request to read data from the bulk endpoint of Interface Two. Accordingly, URB 501 will define the URB_FUNCTION_BULK_OR_INTERRUPT_TRANSFER function and will include a PipeHandle of PH4. It is noted that proxy 310 and agent 350 would handle a request to write data to the bulk endpoint in the same manner.

In step 1b, agent 350 will extract the PipeHandle from URB 501 and use it to access lookup table 310a. As shown in FIG. 3D, lookup table 310a maps PH4 to SID2, and therefore, agent 350 will extract SID2 from lookup table 310a so that it can route URB 501 over the socket that was created for the bulk endpoint of Interface Two. More specifically, in step 1c, agent 350 will employ SID2 to send packets containing URB 501 (or the contents of URB 501) over the TCP socket having a socket ID of SID2.

Although not shown, upon receiving URB 501, proxy 310 will send the URB to device 240 (via stub driver 220 and bus driver 230) to cause the requested data to be read. Then, as shown in FIG. 5B as step 2a, proxy 310 will receive a responsive URB 501a that includes the read data. URB 501a will also include a PipeHandle of PH4. In step 2b, proxy 310 extracts the PipeHandle PH4 from URB 501a and uses it to retrieve the mapped socket ID, SID2, from lookup table 310a. In step 2c, proxy 310 sends URB 501a (or the contents of URB 501a) over the TCP socket having a socket ID of SID2. Although not shown, agent 350 will receive URB 501a and route it back to device stack 280.

Accordingly, by creating sockets for each endpoint of redirected USB device 240 (or for each endpoint of any interface of USB device 240 that is redirected) and by creating lookup table 310a to map PipeHandles to socket IDs, proxy 310 and agent 350 can ensure that any URB pertaining to an isochronous endpoint will be sent over a UDP socket. Both proxy 310 and agent 350 can be configured to provide ordered delivery of packets over these UDP sockets, but will not provide any guarantee of delivery (i.e., they will not resend any packets that are lost). At the same time, proxy 310 and agent 350 can ensure that any URB pertaining to a non-isochronous endpoint will be sent over a TCP socket (or at least over a UDP socket that provides ordered and guaranteed delivery of packets).

FIG. 6 provides a flowchart of an example method for accelerating isochronous endpoints of redirected USB devices. Method 600 can be implemented by proxy 310 and/or agent 350.

Method 600 includes an act 601 of, in conjunction with redirecting a USB device that is connected to a client terminal so that the USB device is accessible within a remote session on a server, obtaining, for each of one or more endpoints of the USB device, a pipe handle of the endpoint. For example, proxy 310 can obtain the pipe handle from each USBD_PIPE_INFORMATION structure that is identified in response to a request to select a configuration of USB device 240.

Method 600 includes an act 602 of, for each of the one or more endpoints, determining a pipe type of the endpoint and, when the pipe type is isochronous, creating a socket that does not provide a guarantee of delivery, whereas, when the pipe type is not isochronous, creating a socket that provides a guarantee of delivery. For example, proxy 310 can create a UDP socket for each isochronous endpoint of USB device 240 and a TCP socket for each non-isochronous endpoint of USB device 240.

Method 600 includes an act 603 of creating a lookup table that maps, for each of the one or more endpoints, the pipe handle of the endpoint to a socket ID of the socket that was created for the endpoint. For example, proxy 310 can create lookup table 310a.

Method 600 includes an act 604 of employing the lookup table to route URBs pertaining to a particular endpoint over the socket that was created for the particular endpoint. For example, proxy 310 can route URB 401a over the UDP socket with a socket ID of SID4 and URB 501a over the TCP socket with a socket ID of SID2.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed in a virtual desktop infrastructure environment, for accelerating isochronous endpoints of redirected USB devices, the method comprising:
   in conjunction with redirecting a USB device that is connected to a client terminal so that the USB device is accessible within a remote session on a server, obtaining, for each of one or more endpoints of the USB device, a pipe handle of the endpoint;
   for each of the one or more endpoints, determining a pipe type of the endpoint and, when the pipe type is isochronous, creating a socket that does not provide a guarantee of delivery, whereas, when the pipe type is not isochronous, creating a socket that provides a guarantee of delivery;
   creating a lookup table that maps, for each of the one or more endpoints, the pipe handle of the endpoint to a socket ID of the socket that was created for the endpoint; and
   employing the lookup table to route USB request blocks (URBs) pertaining to a particular endpoint over the socket that was created for the particular endpoint, wherein employing the lookup table to route URBs pertaining to a particular endpoint over the socket that was created for the particular endpoint comprises, for each of the URBs:
   receiving the URB;
   extracting a pipe handle from the URB;
   accessing the lookup table to obtain a socket ID that is mapped to the pipe handle from the URB; and
   sending the URB over the socket having the socket ID that was obtained from the lookup table.

2. The method of claim 1, wherein obtaining, for each of one or more endpoints of the USB device, a pipe handle of the endpoint comprises:
   extracting the pipe handle from an URB that selects a configuration of the USB device.

3. The method of claim 1, wherein obtaining, for each of one or more endpoints of the USB device, a pipe handle of the endpoint comprises:
   extracting the pipe handle from a USBD_PIPE_INFORMATION structure.

4. The method of claim 1, wherein the socket that does not provide a guarantee of delivery comprises a UDP socket.

5. The method of claim 1, wherein creating a socket that does not provide a guarantee of delivery comprises creating a UDP socket that provides ordered delivery of packets.

6. The method of claim 5, wherein creating a socket that provides a guarantee of delivery comprises one of:
   creating a TCP socket; or
   creating a reliable UDP socket.

7. The method of claim 1, wherein a client-side proxy creates the lookup table, the method further comprising:
   sending, by the client-side proxy, the lookup table to a server-side agent;
   wherein both the client-side proxy and the server-side agent employ the lookup table to route URBs pertaining to a particular endpoint over the socket that was created for the particular endpoint.

8. The method of claim 1, wherein the USB device includes multiple endpoints.

9. The method of claim 1, wherein the one or more endpoints include at least one isochronous endpoint and at least one non-isochronous endpoint.

10. The method of claim 9, wherein each of the at least one non-isochronous endpoints is one of: a bulk endpoint, an interrupt endpoint or a control endpoint.

11. A method, performed by a client-side proxy in a virtual desktop infrastructure environment, for accelerating isochronous endpoints of redirected USB devices, the method comprising:
    in conjunction with redirecting a USB device that is connected to a client terminal so that the USB device is accessible within a remote session on a server, obtaining, by the client-side proxy and for each of one or more endpoints of the USB device, a pipe handle of the endpoint;
    for each of the one or more endpoints, determining a pipe type of the endpoint and, when the pipe type is isochronous, creating a UDP socket, whereas, when the pipe type is not isochronous, creating a TCP socket;
    creating a lookup table that maps, for each of the one or more endpoints, the pipe handle of the endpoint to a socket ID of the UDP or TCP socket that was created for the endpoint; and
    employing the lookup table to route USB request blocks (URBs) pertaining to a particular endpoint over the UDP or TCP socket that was created for the particular endpoint such that any URB pertaining to an isochronous endpoint is routed over a UDP socket while any URB pertaining to a non-isochronous endpoint is routed over a TCP socket, wherein employing the lookup table to route URBs pertaining to a particular endpoint over the UDP or TCP socket that was created for the particular endpoint comprises, for each of the URBs:
    receiving the URB;
    extracting a pipe handle from the URB;
    accessing the lookup table to obtain a socket II) that is mapped to the pipe handle from the URB; and
    sending the URB over the socket having the socket ID that was obtained from the lookup table.

12. The method of claim 11, further comprising:
    sending, by the client-side proxy, the lookup table to a server-side agent.

13. The method of claim 12, wherein the one or more endpoints include at least one isochronous endpoint and at least one non-isochronous endpoint.

14. The method of claim 11, wherein creating a UDP socket comprises creating a UDP socket that provides ordered delivery of packets.

15. The method of claim 11, wherein obtaining, for each of one or more endpoints of the USB device, a pipe handle of the endpoint comprises:

extracting the pipe handle from a USBD_PIPE_INFORMATION structure.

16. One or more computer storage media containing computer executable instructions which when executed by one or more processors in a virtual desktop infrastructure environment implement a method for accelerating isochronous endpoints of redirected USB devices, the method comprising:
- in conjunction with redirecting a USB device that is connected to a client terminal so that the USB device is accessible within a remote session on a server, obtaining, by a client-side proxy and for each of one or more endpoints of the USB device, a pipe handle of the endpoint;
- for each of the one or more endpoints, determining a pipe type of the endpoint and, when the pipe type is isochronous, creating a socket that does not provide a guarantee of delivery, whereas, when the pipe type is not isochronous, creating a socket that provides a guarantee of delivery;
- creating a lookup table that maps, for each of the one or more endpoints, the pipe handle of the endpoint to a socket ID of the socket that was created for the endpoint;
- sending the lookup table to a server-side agent; and
- employing, by both the client-side proxy and the server-side agent, the lookup table to route USB request blocks (URBs) pertaining to a particular endpoint over the socket that was created for the particular endpoint, wherein employing the lookup table to route URBs pertaining to a particular endpoint over the socket that was created for the particular endpoint comprises, for each of the URBs:
  - receiving the URB;
  - extracting a pipe handle from the URB;
  - accessing the lookup table to obtain a socket ID that is mapped to the pipe handle from the URB; and
  - sending the URB over the socket having the socket ID that was obtained from the lookup table.

17. The computer storage media of claim 16, wherein the one or more endpoints include at least one isochronous endpoint and at least one non-isochronous endpoint.

18. The computer storage media of claim 16, wherein obtaining, for each of one or more endpoints of the USB device, a pipe handle of the endpoint comprises:
- extracting the pipe handle from an URB that selects a configuration of the USB device.

19. The computer storage media of claim 16, wherein creating a socket that provides a guarantee of delivery comprises one of:
- creating a TCP socket; or
- creating a reliable UDP socket.

* * * * *